United States Patent [19]
Feix et al.

[11] 4,449,189
[45] May 15, 1984

[54] PERSONAL ACCESS CONTROL SYSTEM USING SPEECH AND FACE RECOGNITION

[75] Inventors: Wolfgang H. Feix, Mt. Laurel, N.J.; Hartwig E. Ruell, Fuerstenfeldbruck, Fed. Rep. of Germany

[73] Assignee: Siemens Corporation, Iselin, N.J.

[21] Appl. No.: 323,657

[22] Filed: Nov. 20, 1981

[51] Int. Cl.³ .............................................. G10L 1/00
[52] U.S. Cl. ................................... 364/513.5; 381/41; 381/42
[58] Field of Search ....................... 381/41, 42; 382/2; 364/513.5, 513

[56] References Cited

U.S. PATENT DOCUMENTS

| | | | |
|---|---|---|---|
| 3,999,006 | 12/1976 | Takeuchi et al. | 358/85 |
| 4,109,237 | 8/1978 | Hill . | |
| 4,179,686 | 12/1979 | Bonicalzi et al. | 382/2 |
| 4,239,936 | 12/1980 | Sakoe . | |

OTHER PUBLICATIONS

Haberman, et al., "Automatic Identification of Personnel . . . ", Carnahan Conference, 1976, pp. 23-30.
J. Herron, et al., "Biomedical Image Processing for Dental Facial Abnormalities", published in Proceedings of International Conference on Cybernetics & Society, Washington, DC, IEEE Systems Man & Cybernetics Society, Sep. 19-21, 1977, pp. 462-464.
L. Harmon, et al., "Identification of Human Face Profiles by Computer", published in Pattern Recognition, vol. 10, pp. 301-312, Pergamon Press Ltd. (1978).

*Primary Examiner*—E. S. Matt Kemeny
*Attorney, Agent, or Firm*—Karl F. Milde, Jr.

[57] ABSTRACT

A method and an apparatus are disclosed for identifying an individual through a combination of both speech and face recognition. The voice signature of an interrogated person uttering a key word into a microphone is compared in a pattern matcher with the previously stored voice signature of a known person uttering the same key word to obtain a first similarity score. At the same time, when a key event in the utterance of the key word by the interrogated person occurs, a momentary image of that person's mouth region onto which a grid pattern has been projected is optically recorded and compared with the previusly stored corresponding momentary image of the same known person to obtain a second similarity score. The two similarity scores are analyzed to verify that the identity of the interrogated person is that of the known person.

13 Claims, 6 Drawing Figures

PERSONAL ACCESS CONTROL SYSTEM USING SPEECH AND FACE RECOGNITION

BACKGROUND OF THE INVENTION

1. Field of the Invention

This invention relates to personal access control systems in general and, in particular, to a method and an apparatus for identifying an individual through a combination of speech and face recognition.

2. Description of the Prior Art

Speech recognition methods and apparatus have been used extensively in personal access control systems to limit access to secure facilities and to prevent the unauthorized use of information input and output devices of computers and various other machines. These systems analyze voice input signals to determine the identity or non-identity of an individual who is seeking access to the facility or use of the device.

In a typical system of this type, the individual seeking access or use is requested to utter a particular key word from among a sequence of predefined key words. The utterance of the key word is detected and analyzed by the speech recognition apparatus. The detected voice signature of the uttered key word is compared to a predetermined stored voice signature corresponding to the utterance of the same key word by a previously cleared known individual. Access is permitted when the compared voice signatures of the uttered key word and the stored key word are sufficiently similar to indicate identity of the individual seeking access with the known individual. An example of such a speech recognition system is described in U.S. Pat. No. 4,239,936, entitled "Speech Recognition System", which issued Dec. 16, 1980.

Personal identification using such speech recognition systems can be sufficiently accurate and reliable only if an indefinite computing time is available in which to analyze the uttered key word. But to avoid unacceptable waiting time, in practice the recognition process must be completed within a period of time of about three seconds or so from the initial request for access. For this shortened operation time, personal access control using speech recognition alone is subjected to identification error (the wrong individual is cleared or the right individual is not cleared) and falsification (voice impression, tape recordings, etc.). Further, because of the difficulty of detecting the beginning and duration of speech signals corresponding to utterance of the key word, current speech recognition systems must use highly sophisticated technology, including costly speech signal duration detecting units. Moreover, it has been found that an increase in technical effort to achieve higher speech recognition system accuracy does not produce a proportional increase in the detection accuracy.

Personal access control systems have also been implemented using visual recognition for identification of individuals. Visual recognition systems use characteristic portions of the human body for identification purposes. Typical of this type of access control are fingerprint recognition systems and facial feature recognition systems. One such system is described in U.S. Pat. No. 4,109,237, entitled "Apparatus and Method for Identifying Individuals through the Retinal Vasculature Patterns", issued Aug. 22, 1978. This latter system uses a method of scanning the individual's eye with a light source arranged in a selected pattern and detecting that portion of the light source pattern which is reflected from the person's retina, thereby locating each intercept of the light source pattern with a blood vessel. The intercept pattern thus obtained is then compared with stored intercept patterns previously obtained from individuals who are cleared for access. Personal access control systems using visual recognition alone demand an even higher level of technical effort and sophistication than acoustical recognition systems.

SUMMARY OF THE INVENTION

It is an object of the present invention to provide a method and an apparatus for identifying an individual through a combination of both speech and face recognition which alleviates the disadvantages of and provides greater identification accuracy than personal access control systems using either speech recognition or voice recognition alone.

The method of the present invention provides for identifying an individual through a combination of speech and face recognition as follows: A characteristic sequence of features of the voice is defined in response to the utterance of a predetermined key word by the individual to be identified. A momentary image of a voice-utterance varying portion of the individual's face is formed upon the occurrence of a key event in the utterance of the key word. The defined sequence of voice features and the momentary image of the facial portion are then both used to determine the identity or non-identity of the individual.

In a preferred embodiment of the method of the invention, described in detail below, a first similarity score is computed by comparing the characteristic sequence of voice features defined in response to utterance of the predetermined key word by the individual by means of a pattern matcher with a stored reference sequence of features previously obtained from utterance of the key word by a known person. When a key event in the utterance of the key word by the individual occurs, the momentary image corresponding to the moment of occurrence of the key event is stored. A second similarity score is computed by comparing the stored momentary image thus obtained with a stored reference momentary image.

The second similarity score is computed by comparing the momentary image of the voice-utterance varying portion of the individual's face corresponding to the moment of occurrence of a key event in the utterance of the key word with a stored, previously obtained reference momentary image corresponding to the key event in the utterance of the key word by the known person. Identity of the interrogated individual with the known individual is determined when the first and second similarity scores are above preselected coincidence thresholds.

The apparatus according to the invention includes means for defining a characteristic sequence of features of the voice in response to the utterance of a predetermined key word by the individual to be identified and means for forming a momentary image of a voice-utterance varying portion of the individual's face upon the occurrence of a key event in the utterance of the key word. Connected to both the voice feature sequence defining means and the momentary image forming means are identification means for using both the defined sequence and the momentary image to determine the identity or non-identity of the individual.

In a preferred embodiment of the apparatus, detailed below, the voice feature sequence defining means comprises a microphone, a preamplifier and an extractor. The momentary image forming means comprises a camera, a detector, a memory and a key event detecting unit. The identification means connected to both the defining means and the momentary image forming means includes first and second pattern matchers; first, second and third buffers; a microprocessor control unit and communicating means.

The method and apparatus of the present invention permits the realization of an efficient hybrid personal access control system using a combination of both speech and face recognition. The invention offers improved performance over existing devices, with greater identification accuracy and security protection. Because both speech and face recognition techniques are provided, identification accuracy at specific speech comparison thresholds and facial feature comparison thresholds is greater than for the same thresholds using only one of those techniques.

There have thus been outlined rather broadly the more important objects, features and advantages of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

Embodiments of the method and apparatus of the present invention have been chosen for purposes of illustration and description. The embodiment of the apparatus which utilizes the method is shown in the accompanying drawings forming a part of the specification, wherein.

Throughout the drawings, like elements are referred to by like numerals

DETAILED DESCRIPTION OF PREFERRED EMBODIMENTS

Figure 1:
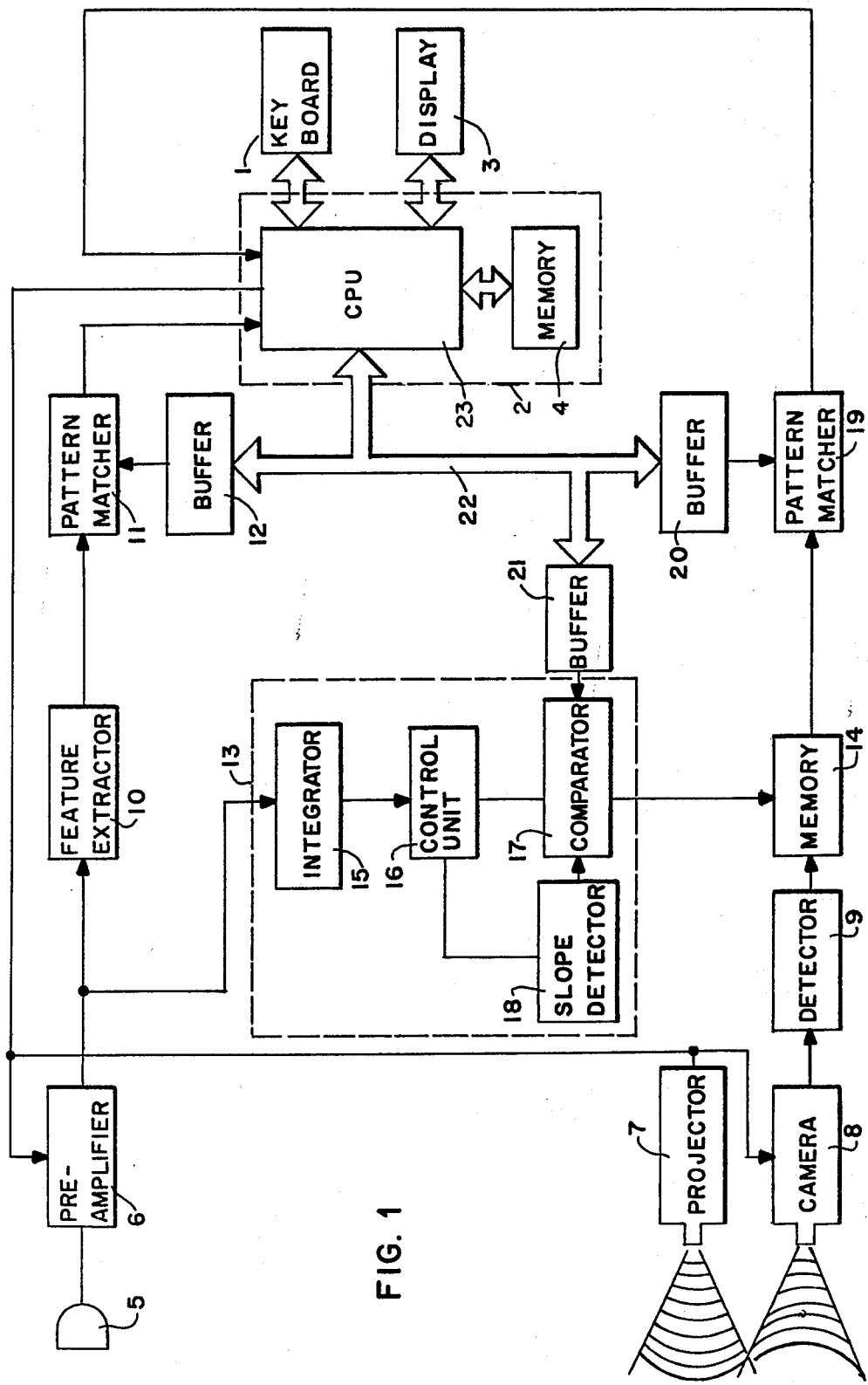
FIG. 1 is a block diagram of the apparatus of a personal access control system in accordance with the present invention.

FIG. 1 illustrates apparatus forming the basis of a personal access control system which identifies an individual based upon the vocal utterance by the individual of a specified key word. The speech or acoustical signal produced by the individual in the utterance of the word is detected and used to define a sequence of voice features. Simultaneously, certain facial features of the individual which vary when the key word is uttered are optically scanned and a momentary image is recorded of the physical position of the facial features at a pre-specified time (a "key event") in the utterance of the key word. The sequence of voice features thus defined and the momentary image thus recorded are then both respectively compared to stored voice features and facial features previously developed from earlier vocal utterance of the same key word by a known individual. If there is sufficient coincidence of the "live" speech and facial features with the stored speech and facial features, the interrogated individual is cleared for access (i.e. the "identity" of the individual is determined). If there is not enough coincidence of both speech and facial features, the interrogated individual is not cleared for access (i.e. the "non-identity" of the individual is determined).

Figures 3, 4, 5:
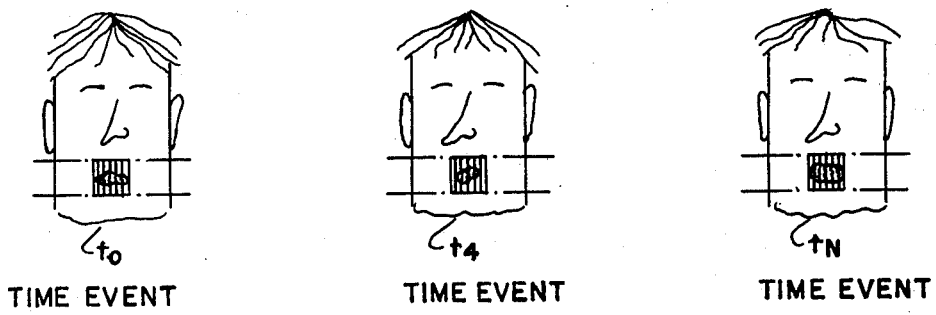
FIGS. 3-5 are schematic representations of an individual uttering a key word which are helpful in understanding the image forming operation of the apparatus of FIG. 1.

Referring to FIG. 1, the identification process is initiated when an individual requests access to a security zone or the like by dialing a certain personal identification number or by inserting a personal identification card into an input device, such as a conventional key board 1. A microprocessor control unit 2 such as an Intel SAB 8080 microprocessor electrically connected for data connumication with the key board 1, receives the personal identification input information from the key board 1. This input information specifies the person whose identity is to be verified. Responsive to receipt of this input, the microprocessor control unit 2 communicates a predetermined key word to the individual to be interrogated by means of a display 3, such as a known LED-display. The key word is determined by random selection from among a plurality of previously specified key words which are stored in a memory 4 within the microprocessor unit 2. At the same time, the control unit 2 activates a microphone 5 which is coupled to a preamplifier 6 and also activates a grid projector 7 which is associated with an electronic camera 8. The grid projector 7 operates to project a grid pattern onto a voice-utterance varying portion of the individual's face. Such pattern may, for example, take the form of the line pattern shown in FIGS. 3-5, which is projected onto the mouth region of the individual. The grid projector 7 used to project the grid pattern for identification purposes is in accordance with known techniques, such as described in J. Herron, et al. "Biomedical Imaging Processing for Dental Facial Abnormalities", published in *Proceedings of International Conference on Cybernetics & Society, Washington, D.C.*, IEEE Systems Man & Cybernetics Society, Sept. 19-21, 1977, at pages 462-464.

Once the grid pattern has been projected onto the individual's face, the electronic camera 8 focuses on the mouth region of the individual and is activated to evaluate the distortions of the grid on the mouth region. The camera 8 can be any suitable optical scanning device, such as a raster scanning camera, sensitive to visible and/or infrared regions of the electromagnetic spectrum.

When the individual utters the key word requested by the display 3, the individual's mouth region is being scanned by the electronic camera 8 operating at a standard TV camera scan frequency. Analog signals corresponding to a sequence of momentary images of the mouth region of the individual's face are thereby delivered to a detector 9, such as described in U.S. Pat. No. 4,109,237. The detector 9 converts the analog signals of the camera 8 into digital signals, thereby creating a sequence of momentary images in the form of digital signals at the output of the detector 9.

As the individual speaks, the microphone 5 receives the acoustical voice signals and converts them by means of an associated preamplifier 6 into an electro-acoustical signal. The electro-acoustical signal is transmitted to a feature extractor 10. The feature extractor 10 performs a spectrum analysis of the input electro-acoustical signal and defines a characteristic sequence of features of the voice of the individual uttering the key word. This sequence of features is assembled into a voice signature of the interrogated individual. The voice signature can be a compilation of characteristic frequencies of the voice, or any other desired voice signature and is obtained by known techniques, such as described in U.S. Pat. No. 4,239,936. Connected to the feature extractor 10 is a pattern matcher 11. The pattern matcher calculates the measure of similarity between the "live" input voice signature supplied by the feature extractor 10 and a reference voice signature stored in a buffer 12. The reference voice signature is entered into the buffer 12 from the memory 4 in response to the identification process initiation and is the previously stored voice signature for the uttered key word of the person identified by the personal information input number or card.

The electro-acoustical signals are simultaneously delivered from the preamplifier 6 to a key event detecting unit 13. The key event detecting unit 13 is connected to control a memory 14 coupled to the detector 9, so that the memory stores the digital signals of the momentary image in the sequence of the momentary images delivered from the electronic camera 8 which corresponds to the moment of occurrence of a key event described in the uttered key word, as further described below.

Figure 6:
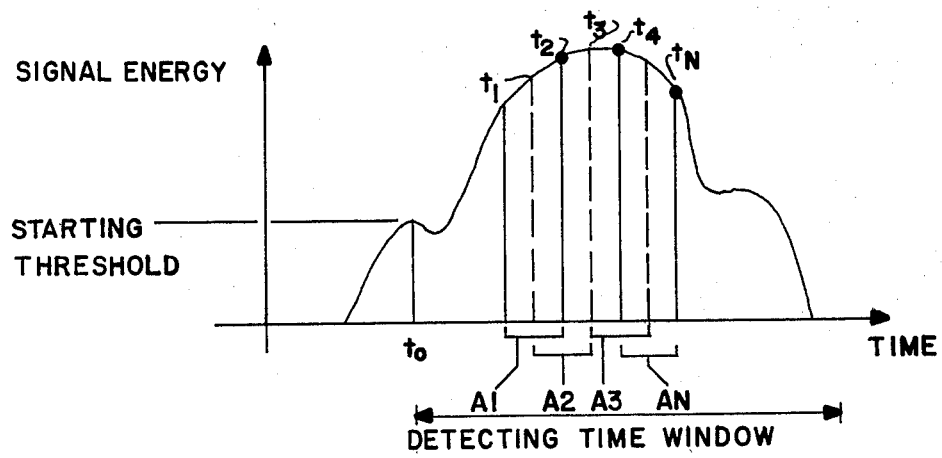
FIG. 6 is a graphical representation of the speech signal energy vs. time for the utterance of the key word by the individual in FIGS. 3-5.

The key event detecting unit 13 comprises an integrator 15 connected to receive the electro-acoustical signal from the preamplifier 6 in response to the vocal utterance of the key word by the individual. The integrator 15 operates to form a time dependent signal corresponding to the energy of the electro-acoustical signal. A representative time dependent signal formed in response to utterance of the key word is shown in FIG. 6. The integrator 15 may take the form of a low pass filter to develop the time dependent signal in an analog way. Alternatively, as shown in FIG. 6, the time dependent signal may be developed in a digital way by sequentially deriving the square of the magnitude of the amplitudes of the electro-acoustical signal for successive intervals $A_1, A_2 \ldots, A_N$ of about 10–20 milliseconds each, over a certain time period (called a "time window"). The time periods $A_1, A_2, \ldots, A_N$ are over-lapping, as shown in FIG. 6. The multiplications for the designated "time events" $t_o$ to $t_n$ in FIG. 6 are used to define the shape of the signal energy. For each time event $t_o$ to $t_n$ a different momentary image of the mouth region is detected (see FIGS. 3–5). An integrator of this type is within the skill of the art as described in U.S. Pat. No. 4,109,237.

Coupled to the output of the integrator 15 is a control unit 16 which detects the beginning of a key word ($t_o$ in FIG. 6) by analyzing the output signal of the integrator 15. The control unit 16 corresponds to the "duration detecting unit" described in U.S. Pat. No. 4,239,936. The beginning of a key word is detected by the control unit 16 by determining whether the amplitude of the signal is greater than the starting threshold (FIG. 6). Having detected the beginning of the key word, the control unit 16 activates a comparator 17 which is coupled to a slope detector 18 as well as to the control unit 16. The comparator 17 compares characteristic slope features of the energy signal (represented, for example, by the time events within a detecting time window) with previously stored slope features stored in a buffer 21 which define the key event and thereby detect the appearance of a key word. The characteristic slope features used to define the key event may be selected in many ways and the choice is largely a matter of individual preference. One way to define the key event is, for example, the moment of occurrence of a starting threshold of a certain magnitude followed by certain magnitudes of the signal energy at two specified successive time events $t_2$ and $t_4$ within a preselected detecting time window. The key event is specified in terms of relative magnitudes of the threshold and amplitudes at $t_2$ and $t_4$ rather than in terms of absolute magnitudes which are subject to conditional variations. The circuitry need for defining the key event in this manner is contructed using known techniques (such as using threshold detectors, counters, comparators and logic elements) and may be performed in either an analog or digital way.

When the occurrence of the key event has been detected by the comparator 17, a storing signal is delivered to the memory 14 causing the memory 14 to store the momentary image of the mouth region corresponding to the key event. For example, the memory 14 may be directed to store the momentary image of the distorted grid pattern shown in FIG. 4 corresponding to the time event $t_4$ in response to the detection of the threshold, amplitude at $t_2$ and amplitude at $t_4$, all within the specified detecting time window. Connected to the memory 14 (controlled by the key event detecting unit 13) is a second pattern matcher 19 for computing a second similarity rate corresponding to the amount of similarity between the momentary image stored in the memory 14 and a reference momentary image stored in a buffer 20 coupled to the second pattern matcher 19 and to the microprocessor control unit 2. The reference momentary image is delivered to the buffer 20 from the memory 4 in response to initiation of the identification process and corresponds to the previously stored momentary image at the key event of the grid pattern projected onto and distorted by the mouth of the person specified by the input information in the utterance of the key word.

The buffers 12, 20 and 21 connected respectively to the first pattern matcher 11, the second pattern matcher 19 and the comparator 17 are all coupled for data communication to the microprocessor unit 2 by means of a data-bus line 22. Reference voice signatures, momentary images and energy signal characteristics (e.g. threshold and signal magnitude values) to define the key event corresponding to the utterance of each possible key word by a plurality of cleared, known persons are stored within the main memory 4 which is addressed by the microprocessor unit 2 for the chosen key word and person named by the input information. The buffers 12, 20 and 21 are loaded with comparison data according to the key word displayed to the individual on the display 4.

The first pattern matcher 11 and the second pattern matcher 19 are coupled to the microprocessor control unit 2 which includes a decision unit 23. The microprocessor unit 2 compares the first similarity score computed by means of the first pattern matcher 11 and the second similarity score computed by means of the second pattern matcher 19 with acceptable predetermined similarity scores stored in the memory 4 of the microprocessor unit 2. If both the first and second similarity scores exceed the preselected comparison rate thresholds, the identity of the interrogated individual with the person specified by the input number or card is verified. If either score is below its respective specified threshold, non-identity is determined and access is denied. The result of the evaluation process is shown on the display 3.

Figure 2:
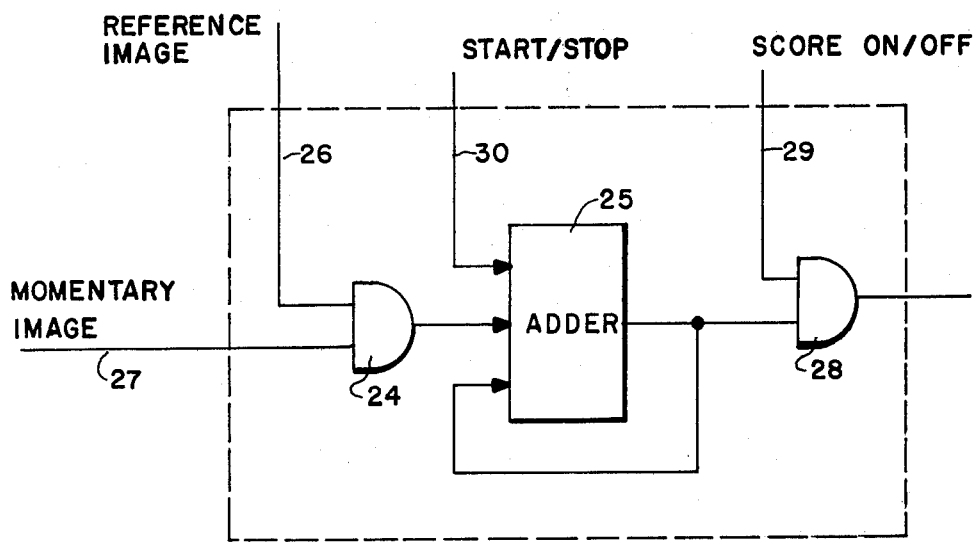
FIG. 2 is a more detailed diagram of part of FIG. 1.

The design of the second pattern matcher 19 is shown in FIG. 2. The second pattern matcher 19 comprises an AND-gate 24 connected to an adder 25. The momentary images stored in digital form in the memory 14 and the buffer 20 are retrieved by sequential addressing. The adder 25 counts whenever a coincidence occurs between the reference signal 26 from the buffer 20 and the momentary image signal 27 delivered from the memory 14. An additional AND-gate 28 connected to the output of the adder 25 serves as a switch to deliver the results of the matching process to the microprocessor unit on request in response to a score signal 29 delivered from the microprocessor unit 2. The microprocessor unit 2 also delivers an enabling signal to the adder 25.

Having thus described the invention with particular reference to the preferred forms of the method and apparatus for a hybrid personal access control system using both speech and face recognition techniques, it will be obvious to those skilled in the art to which the invention pertains, after understanding the invention, that various changes and modifications may be made therein without departing from the spirit and scope of the invention as defined by the claims appended hereto. For example, the choice of key words, the characteristic sequence of features of the voice selected for analysis, and the method of selection of a key event to control storage of the "live" momentary image are all matters of choice and can be varied to suit individual preferences. Further, the use and type of a grid pattern for projection onto an individual's face is a matter of individual selection and other optical scanning techniques can be used. The choice of the grid pattern and mouth features as described is made only as a convenient way to obtain optical image comparison data of a voice-utterance varying portion of the individual's face which can be coordinated with information obtained from the individual's speech in utterance of a preselected word or preselected words. Optical scanning of the eyes, nostrils, throat or cheeks also present possible candidates for speech related examination as do the lungs and other parts of the anatomy not normally considered as part of the face. The term "voice-uttering varying portion of the individual's face" as used herein and in the claims is intended to be defined broadly to encompass such other possibilities.

Additionally, while the personal access system described in detail above is of an identification verification type, those skilled in the art will appreciate that the invention encompasses other systems, such as systems which exclude certain individuals but permit access to all others.

A personal access control system developed in accordance with the principles of the invention as defined above offers greater identification accuracy and reliability for the same complexity and sophistication of the utilized apparatus than a system utilizing speech recognition or individual physical feature recognition, since with a system in accordance with the present invention, the simultaneous occurrence of two related identification parameters is being verified.

What is claimed is:
1. A method for identifying an individual through a combination of speech and face recognition which comprises:
   (a) defining a characteristic sequence of features of the voice in response to the utterance of a predetermined key word by the individual to be identified;
   (b) forming a momentary image of a voice-utterance varying portion of the individual's face upon the occurrence of a key event in the utterance of the key word; and
   (c) using both the defined sequence of features and the momentary image in order to determine the identity or non-identity of the individual.
2. A method for identifying an individual through a combination of speech and face recognition which comprises
   (a) defining a characteristic sequence of features of the voice in response to the utterance of a predetermined key word by the individual to be identified;
   (b) forming a sequence of momentary images of a voice-utterance varying portion of the individual's face upon the occurrence of a sequence of key events in the utterance of the key word; and
   (c) using both the defining sequence of features and the sequence of momentary images to determine the identity or non-identity of the individual.
3. A method according to claims 1 or 2, which further comprises communicating the predetermined key word to the individual in response to a request.
4. A method according to claims 1 or 2, which further comprises projecting a grid pattern onto the voice-utterance varying portion of the individual's face.
5. A method according to claim 1, wherein the momentary image forming step comprises:
   (a) scanning the voice-utterance varying portion of the individual's face with an imaging device and thereby creating a sequence of momentary images; and
   (b) detecting the occurrence of the key event and storing that momentary image in the sequence of momentary images which corresponds to the moment of occurrence of the key event;
and wherein the identity determining step comprises:
   (a) computing a first similarity score between the defined sequence of the features and a reference sequence of features;
   (b) computing a second similarity score between the stored momentary image and a known reference momentary image; and
   (c) determining the identity or non-identity of the individual by evaluating the computed first and second similarity score.
6. Apparatus for identifying an individual through a combination of speech and face recognition which comprises:
   (a) means for defining a characteristic sequence of features of the voice in response to the utterance of a predetermined key word by the individual to be identified;
   (b) means for forming a momentary image of a voice-utterance varying portion of the individual's face upon the occurrence of a key event in the utterance of the key word; and
   (c) identification means connected to both the defining means and the momentary image-forming means for using both the defined sequence of fea- tures and the momentary image in order to determine the identity or non-identity of the individual.

7. Apparatus according to claim 6, which further comprises:
    means associated with the defining means for communicating the predetermined key word to the individual in response to a request.

8. Apparatus according to claims 6 or 7 wherein the momentary image forming means comprises means for projecting a grid pattern onto the voice utterance varying portion of the individual's face.

9. Apparatus according to claim 6,
    (a) wherein the momentary image-forming means comprises:
        means for scanning the voice-utterance varying portion of the individual's face to create a sequence of momentary images, and
        means for detecting the occurrence of the key event and storing the momentary image in the sequence of momentary images which corresponds to the moment of occurrence of the key event; and
    (b) wherein the identification means comprises: a first pattern matcher connected to compute a first similarity score between the sequence of features and a reference sequence of features, and
        a second pattern matcher connected to compute a second similarity score between the stored momentary image and a reference momentary image; and
    (c) wherein the identification means comprises means for determining the identity or non-identity of the individual by evaluating the computed first and second similarity scores.

10. Apparatus according to claim 6, wherein the defining means comprises:
    (a) a microphone for developing signals corresponding to the utterance of the predetermined key word by the individual;
    (b) a preamplifier connected to amplify the signals developed by the microphone, and
    (c) an extractor which is coupled to the pre-amplifier to define the sequence of features from the amplified signals.

11. Apparatus according to claim 6, wherein the momentary image forming means comprises:
    (a) an electronic camera for developing scanning signals corresponding to a sequence of momentary images of the voice-utterance varying portion of the individual's face;
    (b) a detector being connected to the electronic camera for converting the signals developed by the electronic camera into digital signals;
    (c) a memory coupled to the detector for receiving the digital signals; and
    (d) a key event detecting unit being connected to control the memory so that the memory stores the digital signals of the momentary image in the sequence of momentary images that corresponds to the moment of occurrence of the key event.

12. Apparatus according to claim 6, wherein the identification means comprises:
    (a) a first buffer for storing a reference sequence of features;
    (b) a first pattern matcher coupled to the defining means and to the first buffer for computing a first similarity score between the sequence of features defined by the defining means and the reference sequence of features;
    (c) a second buffer for storing a reference momentary image;
    (d) a second pattern matcher coupled to the momentary image forming means and the second buffer for computing a second similarity score between the momentary image formed by the momentary image forming means and the reference momentary image;
    (e) a third buffer, coupled to communicate with the momentary image forming means, for storing a reference set of parameters used by the momentary image forming means to define the occurrence of a key event;
    (f) a microprocessor control unit for storing the reference sequence of features, the reference momentary image and the reference set of parameters and coupled to communicate this stored information respectively to the first, second and third buffers; and also coupled to the pattern matchers for determining the identity or non-identity of the individual by evaluating the computed first and second similarity scores; and
    (g) communicating means associated with the microprocessor control unit for communicating the predetermined key word to the individual in response to a request.

13. Apparatus according to claim 6, wherein the momentary image forming means includes a key event detecting unit to detect the occurrence of the key event in the utterance of the key word, the key event detecting unit comprising:
    (a) an integrator coupled to receive the sequence of features from the defining means in the form of an electro-acoustical signal defined in response to the utterance of a key word by the individual and serving to form a time-varying signal which is a function of the amplitude of the electro-acoustical signal;
    (b) a control unit connected to the integrator for detecting the beginning of the key word by analyzing the time-varying signal formed by the integrator;
    (c) a slope detector coupled to the control unit and the integrator to receive the time-dependent signal for detecting characteristic slope features; and
    (d) a comparator coupled to the slope detector and to the control unit for comparing the characteristic slope features detected by the slope detector with predetermined reference slope features defining the key event; and
    (e) means coupled to the comparator to store the momentary image of a voice-utterance varying portion of the individual's face corresponding to the key event in the utterance of the predetermined key word when coincidence between the detected slope features and the reference slope features is determined by the comparator.

* * * * *